No. 693,299. Patented Feb. 11, 1902.
A. P. MORROW.
BICYCLE.
(Application filed Dec. 26, 1899.)
(No Model.)
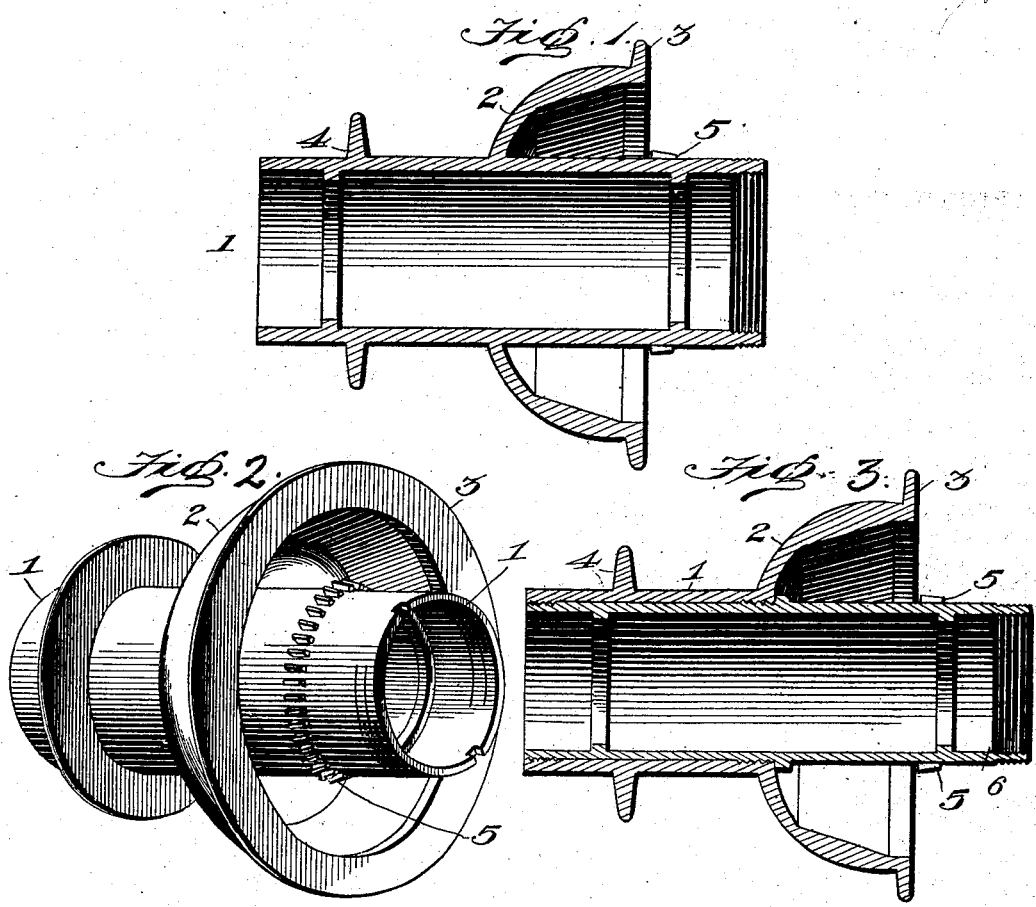
Witnesses
Inventor
Alexander P. Morrow
by Jas. L. Skidmore
his Attorney.

UNITED STATES PATENT OFFICE.

ALEXANDER P. MORROW, OF ELMIRA, NEW YORK.

BICYCLE.

SPECIFICATION forming part of Letters Patent No. 693,299, dated February 11, 1902.

Application filed December 26, 1899. Serial No. 741,633. (No model.)

*To all whom it may concern:*

Be it known that I, ALEXANDER P. MORROW, a citizen of the United States, residing at Elmira, in the county of Chemung and State of New York, have invented certain new and useful Improvements in Bicycles; and I do declare the following to be a full, clear, and exact description of the invention, such as will enable others skilled in the art to which it appertains to make and use the same.

My invention relates to bicycles, and more particularly to a rear-wheel hub for bicycles adapted to support coasting and braking mechanism and provided with a braking-surface arranged intermediate the ends of the hub.

The improvement is designed for use with various forms of hub friction-brakes; and its primary object is to provide a hub with an overhanging brake-flange fixed to or integral with the hub and adapted to coöperate with a laterally-movable brake to arrest the motion of the bicycle by frictional contact between said brake and overhanging flange.

The construction of the improvement will be fully described hereinafter, and defined in the appended claims, in connection with the accompanying drawings, which form a part of this specification.

In the drawings, Figure 1 is a longitudinal section of a bicycle-hub embodying the invention. Fig. 2 is a view in perspective of the form of hub shown in Fig. 1, and Fig. 3 is a sectional view of a slight modification of my invention.

Referring to Fig. 1, the reference-numeral 1 designates a sleeve or cylinder formed intermediate its ends, preferably at about its center, with an integral overhanging brake-flange 2, terminating at its outer edge in an annular vertical perforated spoke-flange 3. The flange 2, as shown in Fig. 1, is of bell shape, and its inner surface is adapted to constitute a braking-surface against which a brake is adapted to bear frictionally. The hub 1 is also provided with an annular spoke-flange 4, which is perforated for the attachment of spokes. The hub is formed with a series of beveled teeth or projections 5, forming annular beveled gripping or clutching surfaces for a laterally-movable element of the brake mechanism.

Instead of forming the entire hub in a single integral piece the sleeve 1 may be only of sufficient length to connect the spoke-flange 4 and the overhanging brake-flange 2, as shown in Fig. 3, and an independent sleeve 6 be employed having a threaded connection with the sleeve 1 of the hub and extending beyond the flanges 2 and 4. In this instance the annular projection formed by the teeth 5 is formed in the sleeve 6, as shown.

I claim as my invention—

1. A bicycle-hub having a fixed hollow overhanging annular brake-flange intermediate its ends; and an annularly-arranged beveled friction-surface on the hub adjacent to the overhanging flange and concentric with said brake-flange.

2. A bicycle-hub comprising an exterior sleeve or cylinder formed at one end, with an integral overhanging flange and adjacent to its opposite end with an annular spoke-flange; and an interior sleeve extending through the exterior sleeve and fixed therein.

3. A bicycle-hub comprising a sleeve or hollow cylinder formed with an integral overhanging annular brake-flange, having an upturned spoke-rim, a series of annularly-disposed beveled friction-teeth adjacent to said brake-flange, and an annularly-disposed spoke-flange adjacent to the other end of the sleeve and concentric with the overhanging brake-flange.

In testimony whereof I affix my signature in presence of two witnesses.

ALEXANDER P. MORROW.

Witnesses:
I. E. MOORHEAD,
GEO. S. GREENE.